United States Patent
Moat et al.

(10) Patent No.: US 7,246,203 B2
(45) Date of Patent: Jul. 17, 2007

(54) QUEUING CACHE FOR VECTORS WITH ELEMENTS IN PREDICTABLE ORDER

(75) Inventors: Kent D. Moat, Winfield, IL (US); Raymond B. Essick, IV, Glen Ellyn, IL (US); Philip E. May, Palatine, IL (US); James M. Norris, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 357 days.

(21) Appl. No.: 10/993,972

(22) Filed: Nov. 19, 2004

(65) Prior Publication Data

US 2006/0112229 A1     May 25, 2006

(51) Int. Cl.
*G06F 12/00* (2006.01)
(52) U.S. Cl. ........................ 711/133; 711/134; 711/135; 711/137
(58) Field of Classification Search ...................... None
See application file for complete search history.

(56) References Cited

U.S. PATENT DOCUMENTS

| 5,721,865 | A | 2/1998 | Shintani et al. |
| 5,896,517 | A | 4/1999 | Wilson |
| 6,202,130 | B1 | 3/2001 | Scales, III et al. |
| 2005/0076181 | A1* | 4/2005 | Hsu ........................... 711/137 |

* cited by examiner

*Primary Examiner*—Reginald Bragdon
*Assistant Examiner*—Mehdi Namazi

(57) ABSTRACT

A cache for storing data elements is disclosed. The cache includes a cache memory having one or more lines and one or more cache line counters, each associated with a line of the cache memory. In operation, a cache line counter of the one or more of cache line counters is incremented when a request is received to prefetch a data element into the cache memory and is decremented when the data element is consumed. Optionally, one or more reference queues may be used to store the locations of data elements in the cache memory. In one embodiment, data cannot be evicted from cache lines unless the associated cache line counters indicate that the prefetched data has been consumed.

20 Claims, 2 Drawing Sheets

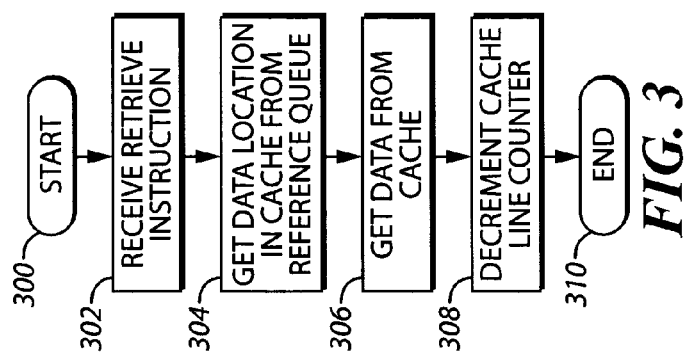
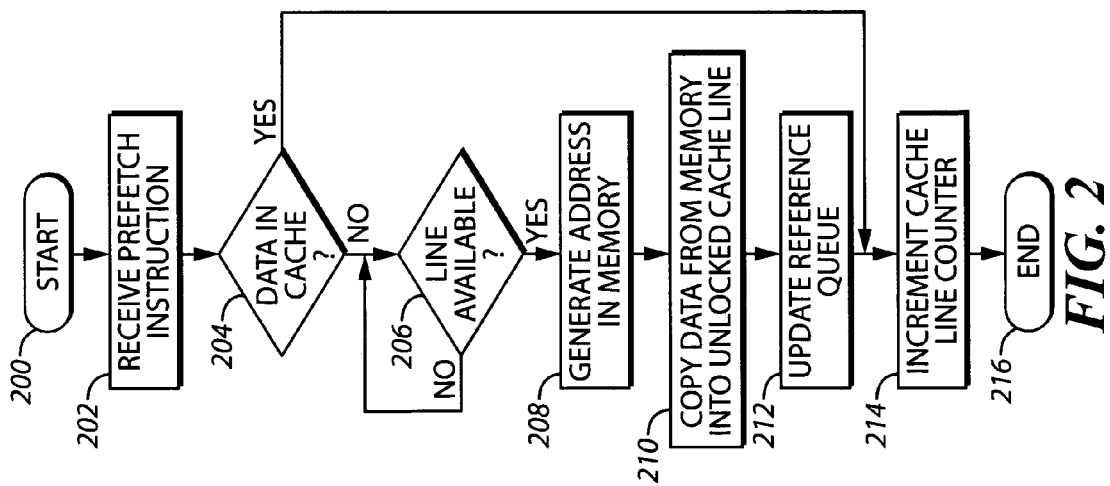

QUEUING CACHE FOR VECTORS WITH ELEMENTS IN PREDICTABLE ORDER

FIELD

This invention relates generally to data processing systems. More particularly, this invention relates to a data processing system that processes vector data.

BACKGROUND

It is known that effects of memory access latencies in a data processing system may be mitigated by moving elements of vector data into a local, high-speed memory known as a cache. The elements are moved, or prefetched, into the cache before they are needed so that they are readily available when requested. If the elements are in a predictable order, there is no theoretical limit to how far in advance the elements may be fetched. However, since the cache has a limited size, if elements are fetched too far in advance, prior elements may be displaced from the cache before they have been used. This can lead to the phenomenon of "thrashing", where an element is prefetched and displaced multiple times before they are used. As a consequence, the performance of the data processing system may be worse than if no cache is used.

One approach to prevent thrashing is to prefetch elements directly from memory or indirectly via a cache into a sequentially ordered storage memory or queue. Once queued, elements remain in the queue until used, thus reducing thrashing. A disadvantage of this approach is that repeated accesses to an element either within or between vectors will result in the element being duplicated in the queue as well as in the cache. Additionally, if the element is evicted from the cache before subsequent prefetches, then the element must be fetched from memory again. In the worse case, this would result in a performance similar to having no cache.

Another approach is to provide prefetch instructions and place the burden on the programmer to use them in a manner that avoids thrashing. A disadvantage of this approach is that changes in the sparseness of the vector elements, the number of vectors, the memory access latency and even cache line replacement policy can require changes in the placement of the prefetch instructions.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein

FIG. 2 is a flow chart of an embodiment of a method for processing prefetch instructions in accordance with an aspect of the invention.

FIG. 3 is a flow chart of one embodiment of a method for retrieving data vector elements from a cache in accordance with an aspect of the invention.

DETAILED DESCRIPTION

Figure 1:
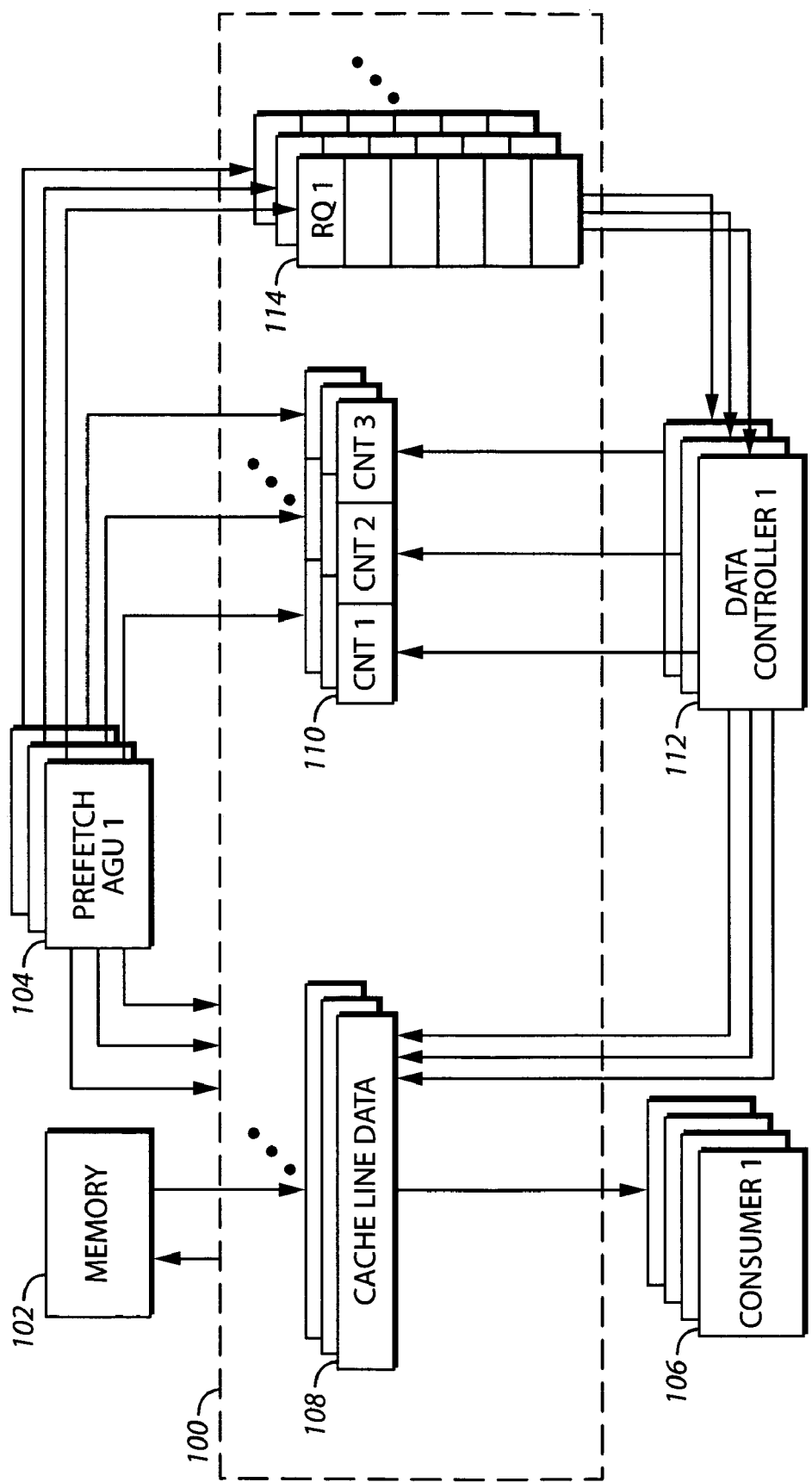
FIG. 1 is a diagrammatic representation of a cache system in accordance with an embodiment of the present invention.

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

An exemplary embodiment of a system of the present invention is shown in FIG. 1. FIG. 1 shows a data processing system comprising a cache 100, a memory 102, one or more prefetch address generator units 104 and one or more consumers 106. Consumers 106 are devices that use the data elements and may include an arithmetic/logic unit of the data processor, for example. In operation, data vector elements from the memory 102 are prefetched into the cache 100 to make the data elements available to the consumers 106.

The cache 100 includes a high speed cache memory 108, in which the data is arranged in lines. It will be obvious to those of ordinary skill in the art, that the cache memory 108 may be arranged in sub-regions of any shape. Hence, when reference is made to a line of the cache, it is to be understood that this is equivalent to a sub-region of the cache memory. Multiple data element vectors may be stored in a sub-region. The cache 100 may be shared between multiple data consumers 106. The cache includes a number of cache line counters 110 (also called, more simply, "counters"). Each cache line counter 110 is associated with a cache data line in the cache memory 108. A plurality of cache line counters may be associated with one cache data line. In operation, when a prefetch instruction is processed, a corresponding cache line counter is incremented. A prefetch instruction is an instruction to prefetch a vector data element from a memory into the cache. When a vector data element is used (also called "consumed") by a consumer 106, the corresponding cache line counter or counters are decremented. Data elements cannot be evicted from the cache unless the corresponding cache line counter or counters indicate that all of the prefetched data has been used. In this state, the cache is described as 'locked'.

In this embodiment, the cache data line is 'unlocked' when all of the associated counters are zero. This ensures data persistency, that is, data cannot be evicted from the cache before it is consumed and cache thrashing is avoided.

In one embodiment of the invention, a counter is initialized to zero and is increment by one when a prefetch instruction is processed and decremented by one when a data vector element is consumed (unless the counter is already zero). However, it will be obvious to those of ordinary skill in the art that the counters may count up or down and may start at any value without departing from the present invention. Hence the term 'incremented' is taken to mean the addition of a positive number or a negative number. Similarly, the term 'decremented' is taken to mean the subtraction of a positive number or a negative number. In an alternative embodiment, separate counters are used for counting prefetch requests and data retrievals. The difference between the counters is then used to determine if all prefetched data has been consumed, at which point the counters can be reset and the cache line unlocked.

Since the cache line counter is incremented when a prefetch instruction is processed and decremented when the element is consumed, the cache line counter indicates the excess of prefetches over consumptions. Thus, when the counter is at zero (or its initial value) all of the requested data has been consumed. When all of the counters for a particular cache line are zero it is safe to evict the data in the cache line, and the cache line is unlocked.

Data flow is controlled by one or more data controllers 112 which duplicate the prefetch order of the vector data. A data controller may be a vector stream unit, for example, that allows ordered data values in a vector to be accessed in response to a single instruction. A vector stream unit can do this by regenerating the prefetch order of the memory addresses of the elements. If more than one data controller is used, as for example in a parallel processor, each data controller may have a cache line counter for each data line. For example, referring the FIG. 1, data controller 1 may use cache line counter 1 (CNT 1), data controller 2 may use cache line counter 2 (CNT 2) and data controller 3 may use cache line counter 3 (CNT 3). Also, if more than one data controller 112 is used, a prefetch address generator unit 104 may be associated with each data controller.

In one embodiment of the invention, the order of the prefetched vector data elements is maintained by one or more reference queues 114 that store the cache locations of the prefetched vector data elements. One reference queue 114 may be used for each data controller 112. This eliminates the need to regenerate the memory addresses of elements as they are used, as well as eliminating the need for address matching hardware for elements being read from the cache. The depth of the reference queue 114 is related to the latency of memory fetches, since the reference queue is updated when a request for an element to be prefetched is made, rather than when the element becomes available in the cache memory 108.

By providing a counter 110 for each cache line and for each data controller 112, multiple vectors can share the cache line. Only when all of the counters for a cache line are zero (or have returned to their initial values) can its data be evicted. Thus, any data in a cache line that has any non-zero counters is effectively and automatically locked down and data cannot be evicted.

However, unlocked data remains until the cache line is actually reused, and therefore prefetches can reuse data that is in the cache memory 108 without the need to access the memory 102 again. Thus, when a prefetch instruction is processed, the memory 102 need not be accessed if the data element is already stored in cache memory 108.

The amount of prefetching is limited by the prefetch address generator units 104 to a predetermined number of cache lines that are allowed to be locked down per vector. Since the latency of prefetching a cache line is directly related to the memory access latency, this makes it easy to automatically tune the amount of prefetch to match the memory access latency without programmer intervention.

FIG. 2 is a flow chart of an embodiment of a method for processing prefetch instructions in accordance with certain aspects of the invention. Referring to FIG. 2, following start block 200, the cache system receives a prefetch instruction at block 202. The prefetch instruction is a request for one or more data vector elements to be made available for future use by a consumer 106. At decision block 204, a check is made to determine if the requested element is already stored in the cache. If it not already stored, as indicated by the negative branch from decision block 204, a check is made at decision block 206 to determine if a cache line is available. For example, no cache lines are available if all of the cache lines are locked, or if a maximum number of cache lines has already been locked. Limiting the number of locked cache lines for each data controller/prefetch address generator unit guarantees that some cache memory will be available for other vectors. If a cache line is available, as indicated by the positive branch from decision block 206, the memory address of the element is generated at block 208 and at block 210 the element is copied from memory and stored into the unlocked cache line in the cache memory. At block 212, the reference queue for the element is updated to indicate the position of the element in the cache memory. At block 214, the cache line counter associated with the cache line is incremented. This completes a prefetch into the cache memory.

If no unlocked cache lines are available when a prefetch instruction is received at block 202, and the element is not already in the cache at block 204, the prefetch address generator unit 104 may be stalled at the negative branch of block 206 until a cache line becomes available. Neither the reference queue nor the cache line counter is updated until a cache line becomes available. While the prefetch address generator is stalled, the prefetch instruction is not processed.

If the requested data vector element is already in the cache memory, as indicated by the positive branch from decision block 204, flow continues to block 214 and the cache line counter associated with the cache line is incremented. This also completes a prefetch into the cache memory. At this time, the data vector element is stored in the cache ready for use, and the process terminates at block 216.

FIG. 3 is a flow chart of one embodiment of a method for consuming data vector elements from a cache in accordance with an aspect of the invention. Referring to FIG. 3, following start block 300, a data controller of the cache system receives an instruction to consume a data vector from the cache at block 302. At block 304 the location of the data vector element in the cache memory is retrieved from a reference queue. At block 306 the data vector element is retrieved from the cache memory and provided to a consumer 106, such as an arithmetic/logic unit. At block 308, the cache line counter that is associated with the data vector element and which may be associated with a data controller is decremented to indicate that data vector element has been consumed. The process terminates at block 310. The method described above with reference to FIG. 2 and FIG. 3 allows for multiple prefetches of a particular data vector element to be made without the need to store multiple copies of the element in the cache memory. It also allows elements stored in the cache to persist in the cache until all prefetch requests have been serviced. Additionally, since elements need not be evicted from the cache until new data is stored, future prefetch instructions may be satisfied without the need to re-copy data from the main memory into the cache memory.

In one embodiment, a cache line may be shared between multiple AGU's. In this embodiment, a cache is allocated to a first AGU. When addresses from another AGU are covered by the same cache line, the cache line counter corresponding to that AGU is updated accordingly. In this way, only one memory access is performed to fill the cache line and the cache line is shared by multiple AGU's.

In a further embodiment, multiple vectors can share the same cache line. For example, a cache is allocated to a first AGU. When addresses from another AGU are not covered by the cache line, a further memory access is performed and the cache line counter corresponding to that AGU is updated accordingly.

The method reduces the load on the memory access unit, since multiple prefetch instructions for the same data vector element only require a memory access for the first prefetch instruction; thereafter, processing of the prefetch instruction only requires the cache line counter to be incremented.

The cache system may be used in a variety of applications, but has application to vector processors and vector co-processors.

The present invention has been described in terms of exemplary embodiments. It will be obvious to those of ordinary skill in the art that the invention may be implemented using hardware component such as special purpose hardware and/or dedicated processors. Similarly, general purpose computers, microprocessor based computers, digital signal processors, microcontrollers, dedicated processors, custom circuits, ASICS and/or dedicated hard wired logic may be used to construct alternative equivalent embodiments of the present invention.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A cache for storing data elements, comprising:
    a) a cache memory having one or more cache lines; and
    b) one or more cache line counters, each associated with a cache line of the cache memory;
   wherein, in operation, a cache line counter of the one or more of cache line counters is incremented when a prefetch instruction to prefetch a data element into the cache memory is processed and is decremented when the data element is consumed, and wherein the cache line is locked while the number of prefetch instructions that have been processed exceeds the number of the times the data element has been consumed.

2. A cache in accordance with claim 1, further comprising:
    c) one or more reference queues operable to store the locations of data elements in the cache memory.

3. A cache system for storing data elements, comprising:
    a) a cache memory having one or more cache lines;
    b) one or more data controllers;
    c) one or more cache line counters, each associated with a cache line of the cache memory and with a data controller of the one or more data controllers; and
    d) one or more prefetch address generator units, each associated with a data controller of the one or more data controllers;
   wherein each prefetch address generator unit of the one or more prefetch address generator units is operable to increment a cache line counter of the one or more cache line counters when an instruction to prefetch a data element into the cache memory is processed, and wherein each data controller of the one or data controllers is operable to decrement a cache line counter of the one or more cache line counters when a data element is consumed, and wherein the cache line associated with the cache line counter is locked while the number of prefetch instructions that have been processed exceeds the number of the times the data element has been consumed.

4. A cache system in accordance with claim 3, further comprising:
    e) one or more reference queues each associated with one of the one or more data controllers;
   wherein a prefetch address generator unit of the one or more prefetch address generator units is operable to update a reference queue of the one or more reference queues with the location of a data element in the cache memory when said data element is prefetched into the cache memory.

5. A cache system in accordance with claim 3, wherein the data element is a data vector element and wherein a data controller of the one or more data controllers is a vector stream unit.

6. A cache system in accordance with claim 5, wherein a cache line of the cache memory is operable to store a plurality of data vector elements.

7. A method for caching data in a cache having a cache line comprising:
    a) receiving a prefetch instruction to prefetch a data element from a memory to the cache;
    b) if the data element is not in the cache:
        i. generating a memory address corresponding to a location of the data element in the memory;
        ii. copying the data element stored at the memory address to the cache line of the cache;
    c) incrementing a cache line counter associated with the cache line of the cache; d) decrementing the cache line counter associated with the cache line of the cache when the data element from the cache line of the cache is consumed; and
    e) locking the cache line of the cache, to prevent data elements from being evicted from the cache line, while an associated cache line counter indicates that the number of prefetch instructions for a data element in the cache line exceeds the number of times the data element has been consumed.

8. A method in accordance with claim 7, wherein the data element is only copied to a cache line of the cache if an unlocked cache line is available and if a number of locked lines associated with the data element does not exceed a predetermined number of locked lines.

9. A method in accordance with claim 7, further comprising:
    f) if the data element is not in the cache, updating a reference queue with an indicator of the location where the data element will be stored in the cache.

10. A method in accordance with claim 9, wherein retrieving the data element from a cache line of the cache comprises retrieving the indicator of the location of the data element in the cache from the reference queue.

11. A method for preventing thrashing in a cache, comprising:
    a) storing a data element in a region of the cache in response to a first request to prefetch the data element;
    b) incrementing a counter associated with the region of the cache;
    c) incrementing the counter in response to each additional request to prefetch for the data element;
    d) decrementing the counter each time the data element is retrieved from the cache; and
    e) locking the region of the cache if the counter indicates that the number of requests to prefetch the data element to the cache exceeds the number of times the data element has been retrieved from the cache.

12. A method in accordance with claim 11, further comprising:
    f) storing the location of the data element in the cache in a reference queue to facilitate retrieval of the data element.

13. A method in accordance with claim 11, wherein the region is a first region of a cache having a plurality of regions, the method further comprising:
    performing the method of claim 12 on a second region of the cache only if the second region of the cache is unlocked and if a number of locked regions locked in accordance with the method of claim 12 and associated with the data element does not exceed a predetermined number of locked regions.

14. A method for preventing thrashing in a cache, comprising:
- a) storing a data element in a region of the cache in response to a first request to prefetch the data element;
- b) counting the number of requests to prefetch the data element to the region of the cache;
- c) counting the number of times the data element is retrieved from the region of the cache; and
- d) locking the region of the cache if the number of requests to prefetch the data element exceeds the number of times the data element has been retrieved from the cache.

15. A method in accordance with claim 14, wherein the region of the cache contains a plurality of data elements, further comprising:
- e) locking the region of the cache if the number of requests to prefetch any data element of the plurality of data elements exceeds the number of times that data element has been retrieved from the cache.

16. A method in accordance with claim 14, wherein retrieval of a data element from the region of the cache is controlled by a plurality of data controllers and the prefetching of a data element is controlled by a corresponding plurality of prefetch address generator units, the method further comprising:
- f) locking the region of the cache if the number of requests to prefetch the data element by any prefetch address generator unit of the plurality of prefetch address generator units exceeds the number of times that data element has been retrieved from the cache by the corresponding data controller of the plurality of data controllers.

17. A method in accordance with claim 16, wherein each prefetch address generator unit of the plurality of prefetch address generator units is operable to store data elements in a limited number of sub-regions of the cache.

18. A method in accordance with claim 14, wherein the region is a first region of a cache having a plurality of regions, the method further comprising:
performing the method of claim 15 on a second region of the cache only if the second region of the cache is unlocked and if a number of locked regions locked in accordance with the method of claim 15 and associated with the data element does not exceed a predetermined number of locked regions.

19. A method for caching data in a cache having a cache line comprising:
- a) receiving a prefetch request to copy a data element from a memory to the cache;
- b) if the data element is not in the cache:
    - iii. generating a memory address corresponding to a location of the data element in a memory;
    - iv. copying the data element stored at the memory address to the cache line of the cache; and
- c) locking the cache line of the cache, to prevent data elements from being evicted from the cache line, while the number of prefetch requests for a data element in the cache line exceeds the number of times that the data element has been retrieved from the cache.

20. A method in accordance with claim 19, wherein the data element is only copied to a cache line of the cache if an unlocked cache line is available and if a number of locked lines associated with the data element does not exceed a predetermined number of locked lines.

* * * * *